United States Patent

Bruckert et al.

[11] Patent Number: 5,940,799
[45] Date of Patent: *Aug. 17, 1999

[54] SYSTEM AND METHOD FOR SECURING SPEECH TRANSACTIONS

[75] Inventors: Eugene J. Bruckert, Arlington Heights; Louis D. Finkelstein, Wheeling; Daniel P. Brown, Elmhurst, all of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/929,608

[22] Filed: Sep. 15, 1997

[51] Int. Cl.⁶ .................................................... G10L 9/08
[52] U.S. Cl. .......................... 704/273; 704/270; 704/275; 704/251; 704/243; 379/88; 379/89; 379/93.08
[58] Field of Search ........................... 379/88, 89, 93.08, 379/93.09, 201, 216, 100.08; 704/270, 275, 251, 243, 273; 380/23, 25

[56] References Cited

U.S. PATENT DOCUMENTS

| | | | |
|---|---|---|---|
| 4,776,016 | 10/1988 | Hansen | 704/275 |
| 4,783,798 | 11/1988 | Leibholz et al. | 380/23 |
| 4,962,449 | 10/1990 | Schlesinger | 395/186 |
| 5,153,918 | 10/1992 | Tuai | 380/25 |
| 5,165,095 | 11/1992 | Borcherding | 379/88 |
| 5,297,183 | 3/1994 | Bareis et al. | 379/59 |
| 5,305,456 | 4/1994 | Boitana | 395/186 |
| 5,335,276 | 8/1994 | Thompson et al. | 380/21 |
| 5,349,636 | 9/1994 | Irribarren | 379/89 |
| 5,592,538 | 1/1997 | Kosowsky et al. | 379/93.08 |
| 5,677,989 | 10/1997 | Rabin et al. | 704/246 |
| 5,748,890 | 5/1998 | Goldberg et al. | 395/188.01 |
| 5,764,736 | 6/1998 | Shachar et al. | 379/93.09 |

*Primary Examiner*—David R. Hudspeth
*Assistant Examiner*—Vijay B. Chawan
*Attorney, Agent, or Firm*—Kenneth A. Haas

[57] ABSTRACT

A processing system that is accessible via a number of speech transmission media. Access to the processing system may be made via a mobile radiotelephone, land line telephone, acoustic link or datalink. Access to programs, files and data is based upon the security of the communication media and authentication of the user.

18 Claims, 2 Drawing Sheets

SYSTEM AND METHOD FOR SECURING SPEECH TRANSACTIONS

FIELD OF THE INVENTION

The present invention relates generally to communication systems and more particularly to a system and method for securing speech transactions conducted over the communication system.

BACKGROUND OF THE INVENTION

"Computer...." This simple voice command long the exclusive domain of science fiction for initiating an exchange between a person and a computer is fast becoming the preferred method of accessing a computer. Speech recognition software is now readily available to run on personal computers (PCs) in real time. These software programs allow the PC user to manipulate the PC, open software programs, perform functions, dictate letters and other documents and perform any number of tasks without keyboards, mice or other pointing/selecting devices. Instead, the software literally responds to the user's beck and call to perform tasks by recognizing spoken words.

These software programs have seen and will see continued application on PCs. Already users have the ability to call into their computer from remote locations and access documents, files and data. Soon the remote user will be able to manipulate documents, files and data or cause the computer to communicate them to other locations via electronic transfer or facsimile transmission through oral commands given over a telephone, data link or other type of connection.

Speech recognition is also fast entering the commercial domain. In phonetics, speech is what is spoken by people. It is composed of "voiced" and "unvoiced" sounds (voiced sounds using at least in part the vocal cords). Many computerized telephone answering systems recognize spoken words for answering and transferring incoming calls. Soon a bank depositor will have the ability to call into his bank and access his account through spoken commands. In other applications, consumers may manage investments, make purchases, and perform any number of transactions, which once required a keyboard and/or numeric pad for data entry using speech recognition.

The notion of recognizing and authorizing a transaction is known for hardware applications. For example, in a mobile radiotelephone communication system, the communication system queries and authenticates the hardware, i.e., the mobile station, as it attempts to access the network. Similarly, a peripheral device, such as a printer, terminal, modem or the like, is recognized by a device name and potentially a password when connected to a computer network.

Speech recognition, however, and particularly as its capabilities are enhanced and adapted for facilitating financial transactions raises serious security concerns. The user will access the system using only spoken commands, frequently from unsecure connections. The system must not only be capable of recognizing the user by his speech, but it must also be capable of authenticating the user from the received speech sample before transactions can be approved. In addition, the system must assess the capability of the connection and its security potential for enhanced security. The recognition and authentication problem is exacerbated because the source of the communication may be bandwidth limited, noisy or otherwise unsuitable for proper speech recognition. That is, the speaker may not be in a quiet environment speaking into a calibrated microphone securely linked to the system being accessed. Instead, a user may be calling from remote locations via radio, unsecure telephone networks or over the Internet.

User names, passwords and personal identification numbers (PINs) provide a level of fairly effective security. However, it is well known that secret passwords may be intercepted and used by unscrupulous individuals to access the user's accounts. It is known that, similar to fingerprints, individuals have unique speech prints, and that these speech prints may be used to positively identify a person. Speech identification technology is available today; however, it is generally limited to applications where a very clean sample of the user's speech is available. Where a user is accessing the computer system via a telephone network, the speech sample may not be of sufficient quality to effect authentication with sufficient confidence. Hence, there is a need for a system and method for securing transactions conducted by spoken commands which accounts for the access media. In addition, there is a need to enhance speech recognition technology by adapting the speech recognition system to the equipment and media employed to access the speech recognition system.

DETAILED DESCRIPTION OF THE PREFERRED EMBODIMENTS

The present invention will be described in terms of several preferred embodiments of a processing system which may be accessed via a number of voice transmission media. Particularly, one preferred embodiment of the present invention provides access to the processing system via a mobile radiotelephone link to a land line telephone network coupled to the processing system. One of ordinary skill in the art, however, will readily recognize the present invention to have application far beyond the preferred embodiments described herein.

Figure 1:
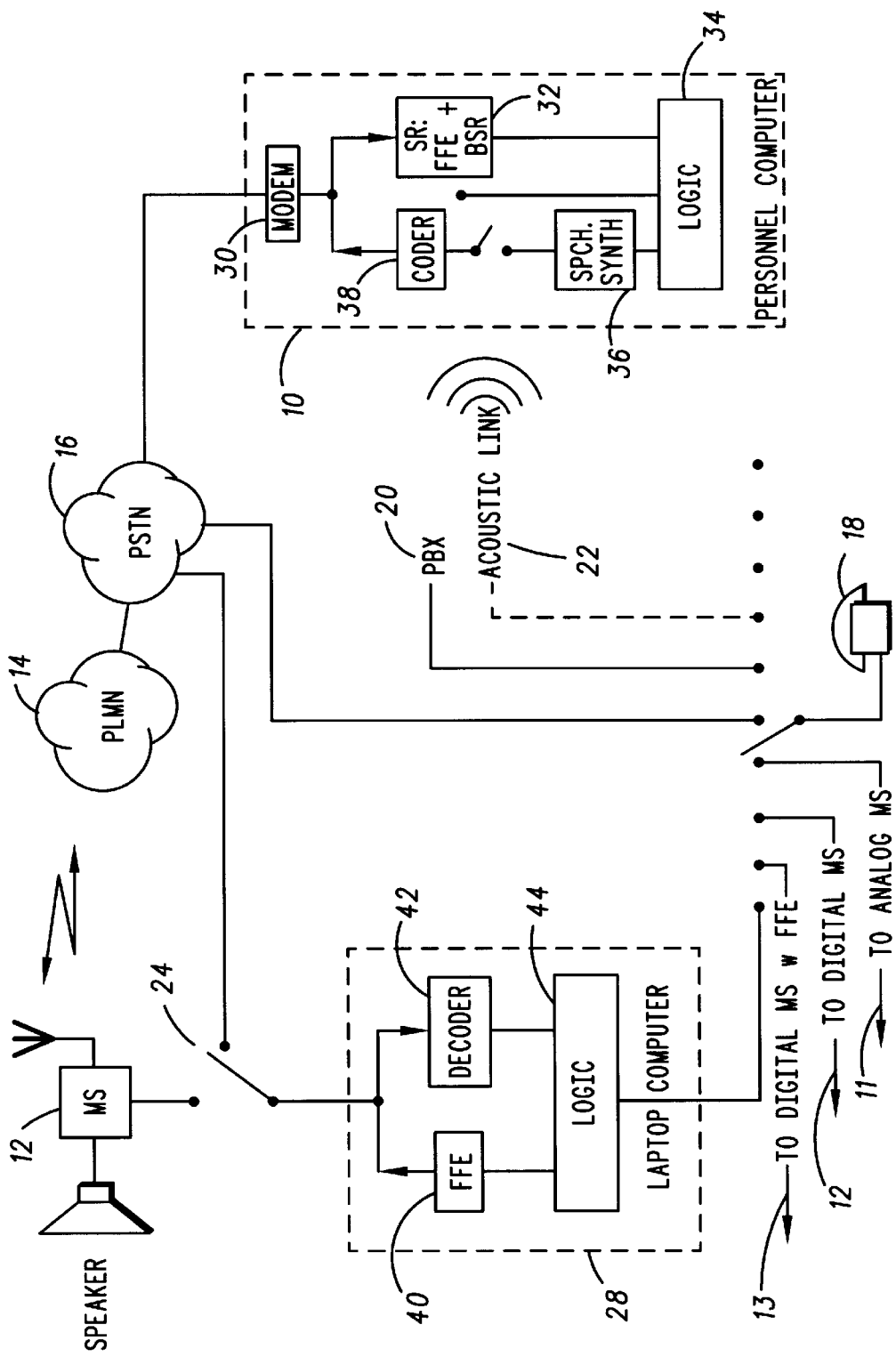
FIG. 1 is a schematic illustration of a communication system in accordance with a preferred embodiment of the present invention.

With reference to FIG. 1, a computer system 10 is adapted to be accessed through a variety of access media. As seen in FIG. 1, computer system 10 may be accessed with a non-secure telephone such as a mobile radiotelephone station (MS, generally shown as 11–13, analog MS link shown as 11, digital MS link shown as 12) coupled via mobile network 14 and public switched telephone network (PSTN) 16. Computer system 10 may also be accessed with a land line based telephone 18 or a private branch exchange (PBX) 20 coupled via PSTN 16. Computer system 10 may also be accessed through an acoustic link 22. The user might also access the system using a MS 12 equipped with a data link 24 and a front end feature extractor (FFE) built into MS 12 (e.g. MS 13), a laptop computer 28 with its own data link connected to the MS 12 data port, or another type of device having similar functionality to FFE. (note that FFE 40 logic 44 could also be part of a mobile station or a modem terminal). The data link 24 is preferably a 9.6 kilobits per second (kbits/s) asynchronous link which should be sufficient for transmitting the FFE information.

The FFE transforms speech into periodically updated, limited-length parameters as described in "Robust Speech Recognition" by Richard J. Mammone, et al. IEEE Signal Processing Magazine, pp 58–71, Sep. 1996. Other subprograms of the speech recognizer, commonly called the background speech recognizer, turn the time varying sequence of parameters into readable text.

With further reference to FIG. 1, computer system 10 includes a modem 30 for coupling to PSTN 16, a speech recognition (SR) device 32 includes a front end feature extractor (FFE) and back-end speech recognizer (BSR) coupled to a memory and processor (generally shown as logic 34) a speech synthesizer 36 and a coder 38. Similarly, laptop 28 includes a front end feature extractor 40 and decoder 42 coupled to a memory and processor (generally shown as logic 44).

As is known, authentication of the hardware is possible for the digital MS 12 and digital FFE MS 13 but may be unavailable for analog MS 11. Encryption of the data is feasible for the digital links, but is likely unavailable for analog links. For analog communication, there are available voice scramblers, such as sub-band inverters and secure telephone unit (STU) III scramblers, that privatize communication over the audio bandwidth. These devices and protections ensure privacy of the communication and authentication of the hardware used to access the system, but not the speaker himself. Access protocols and their associated protection mechanisms provide a level of confidence that a proper, authorized user is attempting access to the system.

Table 1 below provides a listing of various access media (media), the modulation type (modulation), the communication bandwidth (bandwidth), the encryption capability of the access media (encryption), and confidence level that authentication can be accomplished (authentication). The data link access method, such as a laptop coupled to either land line telephone 18 or MS 12 may provide a maximum level of security. This is because the dialing terminal may first be authenticated via a challenge/response mechanism and the link itself may be encrypted. It should be understood that any encryption technique may be employed such as the Data Encryption Standard (DES) or proprietary methods. It will be further appreciated that the equipment can, and should be, secured using equipment authentication techniques such as sending secret numbers, e.g. electronic serial numbers (ESNs), by challenge/response mechanisms or time/varying data.

TABLE 1

| Media | Modulation | Bandwidth | Authentication | Encryption |
| --- | --- | --- | --- | --- |
| Acoustic link | Analog | Hi-fi | Low | No |
| Telephone and PSTN | Analog | 300–3000 | Medium | No |
| Laptop computer and PSTN | Modem | 8 kbit/s | High | Yes |
| MS, PLMN, & PSTN | Analog 300–2700 | 300–2700 | Medium | No |
| MS, PLMN, & PSTN | Vocoder | 300–2700 | Medium | ** |
| Laptop (or MS) computer, MS, PLMN, and PSTN | Modem | 8 kbits/s | High | Yes |

**MS may or may not be capable of traffic channel encryption; the network may or may not have encryption enabled.

Where securing the communication media is not possible, such as when system 10 is accessed via an analog telephone link 11 or land line telephone18, additional equipment authentication procedures may be employed. For example, the dialing terminal 11 or 18 may be authenticated by identifying the calling party number via a supplementary service of PSTN 16 with a list of numbers stored in the system memory 34. Where system 10 is accessed using a terminal not contained on the system list, access to system 10 may be denied or limited as discussed more fully below.

User authentication is preferably made via voice print identification. In this case, SR: FFE/BSR 32 within system 10 receives a user voice command and identifies the user via voice print analysis by comparing the voice print with voice prints of authorized users retained in memory 34. The system may then respond, using speech synthesis 36 and coder 38, by reporting to the user that access is granted, restricted or denied.

In a preferred embodiment of the present invention, SR:FFE/BSR 32 is adapted to identify, via a communication characteristic, the communication media such as digital radiotelephone, data link, analog telephone or acoustic link. Where the media provides sufficient communication quality to allow speech recognition, speech recognition user authentication is required. If the communication media is insufficient to provide user speech recognition authentication, alternate user authentication may be provided in the form of PIN entry, password, time varying data entry, etc. With time varying data recognition, the user may input a number via the touch-tone key pad that is a non-linear function of the time of day. System 10, and logic 34 perform the same nonlinear function and where a match occurs the user is authenticated. The user would thus carry a special device that provides the time-varying number or have a hand held calculator program which is programmed to provide the appropriate data.

Given user speech recognition authentication, access to system 10 is set to one of a plurality of access levels. As it is known, however, PINs, passwords and the like may be intercepted. Therefore, absent user voice recognition authentication, access to system 10 may be set to another, less sensitive, access level. Further, there may be programs, files and data within system 10 which may not be accessed for given particular types of communication media, for example, an acoustic link that is susceptible to interception. Other access levels may require communication media security, such as encryption, before access is granted. As will be appreciated, any number of levels of security, depending on the sensitivity of the data being accessed, may be established in association with the communication media utilized to access system 10 and the ability to authenticate the user and secure the communication media. Of course, system 10 is adapted to allow the user to set up the security levels, to assign security levels to files and data and to modify the same with all of this information being retained in memory 34.

As mentioned, various forms of communication media are more or less suitable for voice recognition. However, the voice recognition technique, either through adjustment of filter parameters, correlation algorithms and the like, may be optimized to any particular communication media. And, as SR:FFE/BSR 32 is adapted to recognize the communication media being used to access the system by analyzing, for example, calling party number, dialog with MS 12, or laptop 28 modem tones. Given identified equipment and the communication media, the speech recognition engine may be optimized to the particular equipment and the media. Similarly, logic 34 can also modify the speech synthesizer 36 to account for the remote terminal and media. In this regard, speech recognition is enhanced allowing potentially higher level of access to system 10.

It is further contemplated by the invention that system 10 will be configured to identify unauthorized users and to retain data which may be used to identify such unauthorized users. For example, the calling terminal phone number can be identified, file access attempts recorded and time stamped and an audit trail generated. Unauthorized users may further be granted access to bogus folders and allowed to retrieve files from these folders which might later be traced. These files may be adapted to collect identifying information from the unauthorized user's system and then attempt to contact system 10 from the unauthorized system reporting such information regarding the unauthorized user. If the unauthorized user attempts to access system 10 via speech, the conversations may be recorded.

Figure 2:
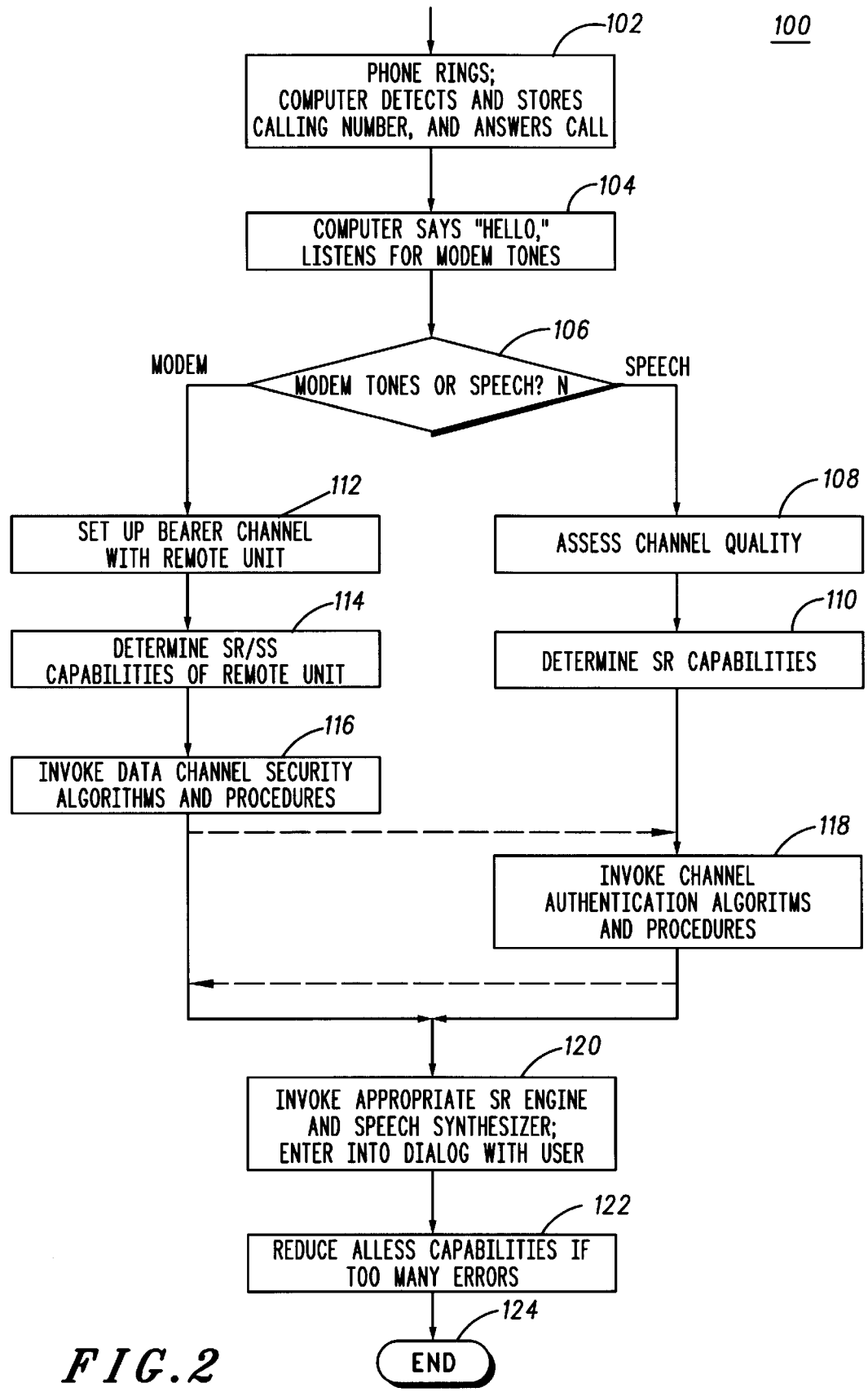
FIG. 2 is a flow diagram illustrating a method of securing a security system in accordance with a preferred embodiment of the present invention.

Operation of system 10 will now be described by way of example and with reference to FIG. 1 and with reference to method 100 shown in FIG. 2. System 10 is set up by the user with security levels and by assigning security levels to programs, files and data. In addition, the user will have calibrated SR/FFE/BSR 32 to recognize his speech as well as the speech of other authorized users, for example co-workers, family members, friends, who are permitted access to system 10.

The user accesses system 10 via any of a plurality of communication media 12–22. System 10 detects the phone ring, the calling party's number and answers the call, step 102. System 10 answers by generating an answer via speech synthesizer 36 and coder 38 (depending on the calling party number) and communicates an answer and waits for modem tones, step 104. At step 106, system 10 determines if it is a speech user or modem access.

If the user is accessing by speech, the method branches to step 108 where SR/FFE/BSR 32 and logic 34 assess the channel quality, step 108, and determine the speech recognition capabilities, step 110. Next, appropriate channel authentication procedures such as speech recognition, equipment authentication as described above are invoked, step 118.

If the user is accessing system 10 by a data link or other modulated communication, as signified by modem tones, the communication channel is set up with remote unit 12 or 28 (step 112). Next, the speech recognition, speech synthesis (SR/SS) capabilities of the remote unit are determined, step 114, and data channel security procedures are invoked, step 116.

With the user authenticated and the communication media secured, the appropriate speech recognition engine is selected based upon the remote unit and the communication media. If remote unit 12 or 28 can transmit FFE data the receive FFE in computer system 10 is bypassed and a dialog between remote unit 12 or 28 and computer system 10 to optimize remote unit's 12 or 28 FFE. (e.g., remote unit 12 or 28 may be used to transmit vocoded speech and FFE speech or remote unit 12 or 28 may have a plurality of FFEs). Computer system 10 configures the back end speech recognizer 32 to optimize intelligibility (to later circuits that operate with speech (e.g., logic 34). For example, if the media is noisy and/or the remote unit FFE does not exactly match system 10 BSR menu, then system 10 can request via speech synthesizer 36 for the speaker to pause between words or to request the speaker to limit his vocabulary to a minimum possible vocabulary. A dialog is entered with the user, step 120. The user then instructs system 10 to perform tasks and to access files and data. Given authentication and communication media security, system 10 controls the user's access in accordance with the established security levels. If the speech recognition deteriorates, as evidenced by the number and frequency of errors, the speech recognition capability may be reduced, and hence, the user's access to system 10 adjusted appropriately, step 122. When the call is concluded, the process ends at step 124.

Overall performance may be enhanced where the user accesses system 10 via laptop 28 using FFE 40 and datalink 24. Moreover, where laptop 28 is capable of speech recognition, performance may be further enhanced and simplified. It should be understood that a mobile radiotelephone with speech recognition capability may also be used. Upon initial contact with system 10 a residue of a public key exchange computation can be utilized as a permanent "secret" key for future authentication. The residue is retained in laptop 28 and system 10. In future sessions with system 10, the user need only authenticate himself to laptop 28, which because of environmental considerations may have better speech recognition capability, and laptop 28 simply authenticates itself with system 10 using a simple challenge/response mechanism that utilizes the public-key residue.

Where sessions between the user and system 10 are set up via a public key exchange, key verification, good encryption and voice print authentication, there may be no limitations on the transmission of sensitive data. A simpler approach may only involve encryption accompanied with voice print authentication under a precalculated key that belongs to some limited key set and may be re-used some number of times. This simpler but less secure mode would then cause restrictions to be imposed as to programs, files and data that the user may access.

It will be appreciated that system 10 may be configured for more than one user. In this case, user data would be retained in memory 34 for each user and in order to perform authentication. Each additional user would have assigned access levels and would only be permitted access to programs, files and data consistent with his authorized access level. For example, in a hierarchical security arrangement the user may be assigned an upper bound of access.

The invention disclosed herein has been described in terms of several preferred implementations including, without limitation, in terms of a processing system capable of being accessed by voice commands received over a mobile radiotelephone system. The invention has been further described in terms of a method of securing a processing system having voice access capabilities. It will be readily appreciated that other implementations, adaptations and embodiments are possible without departing from the fair scope of the invention.

We claim:

1. A system for securing a processing system adapted for access by a user via spoken commands received from one of a plurality of communication media comprising:

a media recognition processor coupled to the processing system and to receive the spoken commands;

a speech recognition device for determining a communication media that is accessing the processing system; and an authorization command generated by the media recognition processor and communicated to the processing system, the authorization command defining a level of security for the current access to the processing system based on the speech recognition devices determination of the communication media used to access the system.

2. The system of claim 1 wherein the communication media comprises one of: an acoustic link, a land line telephone network, a radiotelephone network and a digital communication network.

3. The system of claim 1 wherein the processing system is responsive to the authorization command to restrict access by the user to at least one of a plurality of computer file types.

4. The system of claim 1 wherein the processing system is responsive to the authorization command to prohibit access by the user to the processing system.

5. The system of claim 1 wherein the system comprises communication media security.

6. The system of claim 5 wherein the communication media security comprises one of the group: encryption, scrambling, and authentication.

7. A method for securing a processing system adapted for access via spoken commands received from one of a plurality of communication media:

determining a communication media type being used by a user to access the processing system; and establishing a security level for the user based on the communication media type being used by the user to access the processing system.

8. The method of claim 7 wherein the step of establishing a security level comprises restricting access to at least one file type.

9. The method of claim 7 wherein the step of establishing a security level comprises restricting access to the processing system.

10. The method of claim 7 further comprising the step of securing the communicationmedia.

11. The method of claim 10 wherein the step of securing the communication media comprises one of: encrypting the communication media, scrambling the communication media and authenticating accross the communication media.

12. The method of claim 10 wherein the step of establishing a security level comprises authenticating the user.

13. The method of claim 12 wherein the step of authenticating the user comprises one of: entering a password, exchanging secret data and verifying time varying data.

14. An apparatus for securing a processing system adapted for access via spoken commands received from one of a plurality of communication media:

means for determining a communication media type being used to access the processing system;

means for establishing an access level to the processing system based on the communication media type, wherein the access level defines a level of security given to a particular user, and determines the level of access to particular data existing within the processing system.

15. The apparatus of claim 14 wherein the means for establishing an access level comprises means for restricting access to at least one file type.

16. The apparatus of claim 14 wherein the means for establishing an access level comprises means for restricting access to the processing system.

17. The apparatus of claim 14 further comprising means for securing the communicationmedia.

18. The apparatus of claim 14 wherein the means for securing the communication media comprises one of: means for encrypting the communication, means for scrambling the communication media, and means for authenticating the communication media using passwords.

\* \* \* \* \*